(12) United States Patent
Juvinall et al.

(10) Patent No.: US 6,188,079 B1
(45) Date of Patent: Feb. 13, 2001

(54) MEASUREMENT OF HOT CONTAINER WALL THICKNESS

(75) Inventors: John W. Juvinall, Ottawa Lake, MI (US); James A. Ringlien, Maumee, OH (US)

(73) Assignee: Owens-Brockway Glass Container Inc., Toledo, OH (US)

( * ) Notice: Under 35 U.S.C. 154(b), the term of this patent shall be extended for 0 days.

(21) Appl. No.: 09/228,628

(22) Filed: Jan. 12, 1999

(51) Int. Cl.[7] ................................................ G01N 21/86
(52) U.S. Cl. ............................ 250/559.27; 250/223 B; 356/240
(58) Field of Search .......................... 250/559.27, 223 B, 250/221, 222.1, 223 R; 356/240, 239, 237, 73

(56) References Cited

U.S. PATENT DOCUMENTS

| | | | |
|---|---|---|---|
| 2,915,638 | * | 12/1959 | Poole . |
| 3,188,256 | * | 6/1965 | Shoemaker . |
| 3,356,212 | * | 12/1967 | Landin . |
| 3,373,869 | * | 3/1968 | Burson, Jr. . |
| 3,454,759 | * | 7/1969 | Calhoun . |
| 3,968,368 | * | 7/1976 | Sager . |
| 4,304,995 | * | 12/1981 | Huttunen et al. ................. 250/223 B |
| 4,410,381 | * | 10/1983 | Chapman, II . |
| 4,915,827 | * | 4/1990 | Rosenthal . |

* cited by examiner

Primary Examiner—Que T. Le

(57) ABSTRACT

A method and apparatus of measuring wall thickness of hollow glass articles, such as molded glass containers having interior and exterior wall surfaces, includes the steps of measuring intensity of radiation emitted by the article at a first wavelength at which intensity varies as a function of both temperature at the surfaces and wall thickness between the surfaces, and at a second wavelength at which intensity varies as a function of temperature at the surface substantially independent of wall thickness between the surfaces. Since the first intensity measurement is a function of both wall thickness and temperature, while the second intensity measurement is a function solely of surface temperature, wall thickness between the surfaces can determined as a combined function of the first and second intensity measurements.

24 Claims, 4 Drawing Sheets

MEASUREMENT OF HOT CONTAINER WALL THICKNESS

The present invention is directed to measurement of thickness of glass articles such as hollow glass containers, and more particularly to a method and apparatus for measuring wall thickness of molded glass articles as a function of visible and/or infrared radiation emitted by the articles while they are still hot from the forming process.

BACKGROUND AND SUMMARY OF THE INVENTION

A number of techniques have been proposed, involving radio frequency, capacitive and optical measuring techniques, for measuring wall thickness of molded hollow glass containers after the containers have cooled—i.e., at the so-called cold end of the manufacturing process. However, it is desirable to obtain wall thickness measurement as early as possible in the manufacturing process, preferably at the so-called hot end of the manufacturing process, so that any corrective action that is needed can be implemented as quickly as possible, thereby reducing manufacture of unsatisfactory ware. It is therefore desirable to provide a technique for measuring wall thickness of molded glass containers and other similar articles as soon as possible following the molding process.

It has heretofore been recognized that glass containers that are still hot from the molding process emit radiation in the infrared range, and that this radiation can be measured in an effort to determine container wall thickness characteristics. For example, U.S. Pat. Nos. 2,915,638 and 3,356,212 propose to measure infrared energy radiated from the exterior surface of hot containers, and to employ the resulting data to infer container wall thickness information. Once the containers have begun to cool, the thicker portions of the containers will retain heat longer than the thinner portions, and the exterior surface temperature will therefore be highest at the thicker portions of the container. Wall thickness information can therefore be inferred from the temperature profiles of the containers. However, the prior art does not disclose a technique for obtaining an absolute measurement of container wall thickness at the hot end of the manufacturing process, and it is a general object of the present invention to provide such a technique.

A method of measuring wall thickness of hollow glass articles, such as molded glass containers having interior and exterior wall surfaces, in accordance with the present invention, includes the steps of measuring intensity of electromagnetic radiation emitted by the article at a first wavelength at which intensity varies as a function of both temperature at the surfaces and wall thickness between the surfaces, and at a second wavelength at which intensity varies as a function of surface temperature at the article surface substantially independent of wall thickness between the surfaces. Since the first intensity measurement is a function of both wall thickness and temperature, while the second intensity measurement is a function solely of temperature, wall thickness between the surfaces can be determined as a combined function of the first and second intensity measurements. (It will be appreciated, of course, that the term "wavelength" normally would encompass a wavelength range because sensors are not responsive solely to a specific wavelength.)

In some preferred embodiments of the invention, the first and second intensity measurements are obtained from radiation emitted from one point on the article surface. A relationship between wall thickness and surface temperature at this point on the article surface is developed from these intensity measurements. Intensity of radiation emitted from other points on the article surface can then be measured at the infrared wavelength at which intensity varies solely as a function of surface temperature, and wall thickness can be determined at such other points on the article surface as a combined function of such intensity measurements and the relationship between wall thickness and surface temperature previously developed.

In some preferred embodiments of the invention, the sensors include an area array sensor having a multiplicity of sensing elements and means for focusing onto such elements light energy (visible and/or infrared) emitted from different points on the container surface, and a second sensor responsive to energy emitted from a single point on the container surface. An absolute measurement of container wall thickness is obtained from the output of the second sensor responsive to energy emitted from the single surface point at the first wavelength, and from the output of the element on the area array sensor focused on the same point and responsive to energy emitted at the second wavelength. Given this absolute measurement of wall thickness, and thus the relationship between wall thickness and surface temperature at this one point on the container surface, wall thickness at other points on the container surface can then be determined as a function of energy indicative of exterior surface temperature incident on the other elements of the area array sensor.

In other preferred embodiments of the invention, a reflector is positioned between the two infrared sensors and the container or other article under inspection such that the detectors have fields of view that are coincident at the surface of the container. Thus, the detectors simultaneously receive radiation from a single point or area at the surface of the container to develop the associated signals representative of intensities at the first and second wavelengths. The reflector is coupled to a motor or other suitable mechanism for moving the reflector in such a way that the coincident fields of view of the detectors effectively sweep the surface of the container. In this way, the outputs of the detectors may be scanned at increments of reflector motion to obtain comparative signal data for determining wall thickness at sequential positions along the surface of the container. Most preferably, in this embodiment of the invention, the reflector is moved and the detector outputs are scanned at increments of container motion so as to obtain thickness data along the entire surface of the container. When inspecting containers that are hot from the molding process, the inspection may be performed while the containers are moved along the linear conveyor between the machine in which the molding is performed and the annealing lehr by positioning an optical inspection system on both sides of the conveyor for obtaining thickness data from both sides of the container.

The first wavelength at which intensity is measured as a function of both temperature at the container surface, and wall thickness between the surfaces, is a wavelength at which the article or container wall is substantially transparent. The second wavelength at which intensity is measured as a function of temperature at the surface, and independent of wall thickness between the surfaces, is a wavelength at which the article or container wall is substantially opaque. Transparency and opacity are, of course, relative terms. The glass composition of a container wall is substantially transparent to energy in accordance with the present invention when the transmissivity of the wall is at least 5%. The container wall is substantially opaque to energy in accordance with the present invention when transmissivity of the wall to infrared energy is less than 1%. In the preferred implementation of the invention, energy indicative of both glass temperature and wall thickness is in the visible and infrared range of 0.4 to 1.1 microns. Energy at which the wall is substantially opaque, and at which intensity therefore varies as a function of surface temperature and substantially independent of wall thickness, is preferably in the infrared range of 4.8 to 5.0 microns, and most preferably at about 5.0 microns. Standard commercially available sensors can be obtained having response characteristics within these ranges.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE PREFERRED EMBODIMENTS

Figure 1:
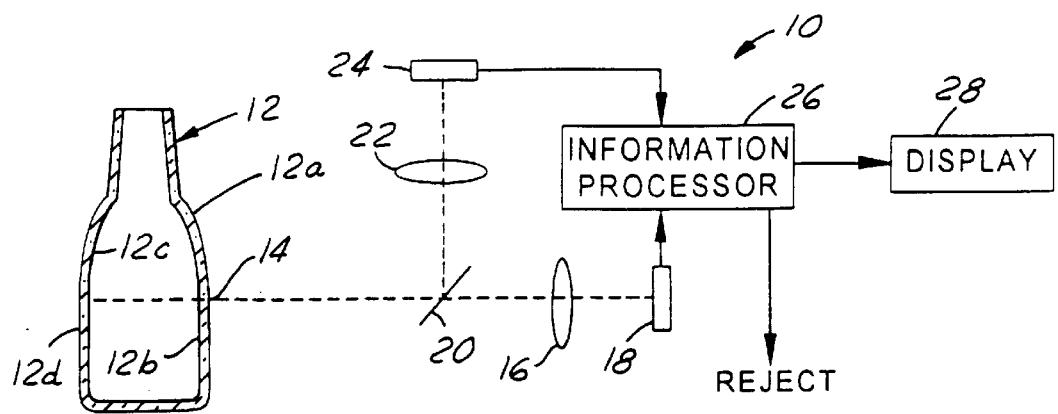
FIG. 1 is a schematic diagram of a basic embodiment of the present invention.

FIG. 1 illustrates an apparatus 10 for measuring wall thickness of a hollow glass container 12 in accordance with a basic embodiment of the invention. Radiant energy emitted from a point 14 on the exterior surface of container 12 is directed by a lens 16 onto a first sensor 18, and by a beamsplitter 20 and a lens 22 onto a second sensor 24. Beamsplitter 20 may be eliminated if lens 22 is disposed to focus onto sensor 24 energy emitted from the same point 14 on container 12 as emits energy onto sensor 18. That is, both sensors 18, 24 receive energy radiated from substantially the same point 14 on the exterior surface of container 12. Sensors 18, 24 provide respective electrical output signals to an information processor 26, which drives a display 28 to provide wall thickness information to a system operator or user, and which may provide a reject signal to suitable means for sorting container 12 from the manufacturing process. Display information can also be used to control the forming process.

Sensor 18, which may include suitable filters, provides its electrical output signal as a function of intensity of radiation at a first wavelength at which the wall of container 12 is substantially transparent. Thus, the radiation at this wavelength incident on sensor 18 is radiated from the volume of glass between surfaces 12a and 12b of container 12, as well as the volume of glass between surfaces 12c and 12d. The amount of energy incident on sensor 18, and the sensor output signal, is a function of both container glass temperature at the various wall surfaces and the sum of the two (near and far) container wall thicknesses—i.e., the thickness between surface 12a, 12b and the thickness between surfaces 12c and 12d. Glasses conventionally employed for container manufactured are substantially transparent to energy in the wavelength range of 0.4 to 1.1 microns, and wavelengths in this range are preferred for sensor 18.

Sensor 24, which again may include suitable filters, is responsive to, and thus provides an output as a function of, energy at a second wavelength at which the wall of container 12 is substantially opaque. That is, the intensity of energy incident on sensor 24 varies as a function of temperature at the exterior surface of container 12 at point 14, and substantially independent of wall thickness between the exterior and interior container surfaces. Glasses conventionally employed for container manufacture are substantially opaque to energy in the wavelength range of 4.8 to 5 microns, and a wavelength of substantially 5 microns is preferred for obtaining this surface temperature measurement. Since the output of sensor 18 varies as a function of both temperature at the container wall surfaces and wall thickness between the surfaces, while the output of sensor 24 varies as a function of temperature at the container exterior surface and substantially independent of wall thickness between the surfaces, information processor 26 may determine absolute wall thickness between surfaces 12a and 12b, and surfaces 12c, 12d, as a combined function of such intensity measurement signals.

Figure 2:
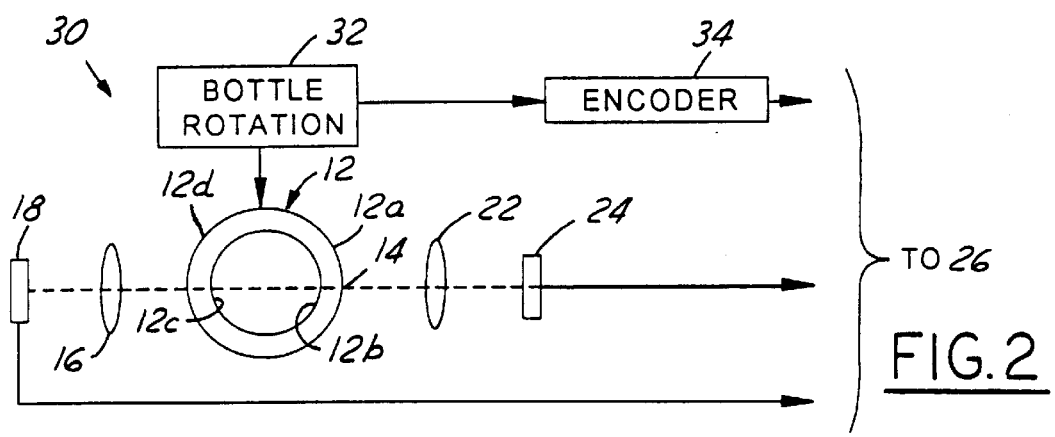
FIG. 2 is a schematic diagram of a modification to the embodiment of FIG. 1.

FIG. 2 illustrates a modified embodiment 30 of the apparatus illustrated in FIG. 1. In this embodiment, sensors 18, 24 with associated lenses 16, 22 are disposed on diametrically opposed sides of container 12. Apparatus 32, such as a pedestal, is operatively coupled to container 12 at inspection station 30 for rotating the container about its central axis, and provides signals indicative of increments of container rotation to information processor 26 by means of an encoder 34. Alternatively, container 12 may be rotated at constant angular velocity, and increments of container rotation can be obtained at equal increments of time. It is important in both of the embodiments of FIGS. 1 and 2 that sensors 18, 24 view substantially the same point 14 on the container exterior surface. In the embodiment of FIG. 2, point 14 is viewed by sensor 18 through the container. Any non-uniformity in wall thickness may refract the view of sensor 18 away from point 14. Similarly, since the intensity signal at sensor 18 varies as a function of two wall thicknesses, it is assumed in each embodiment that these wall thicknesses are identical. In the embodiment of FIG. 2, container 12 may be rotated about its axis and wall thickness measurements obtained at desired increments of container rotation.

Figure 7A:
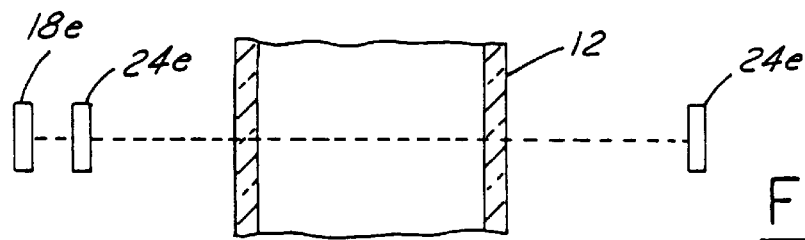
FIGS. 7A, 7B and 7C are schematic diagrams that illustrate calibration of the embodiment of FIG. 2.
Figure 7B:
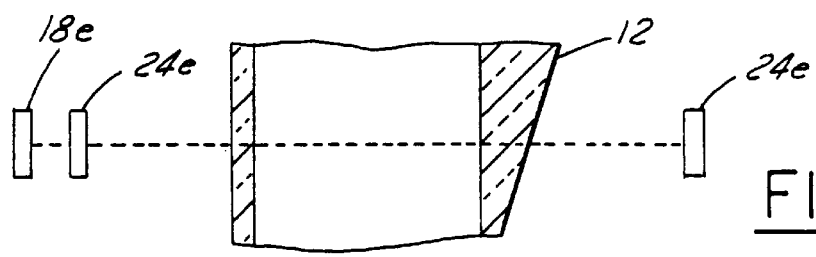
Figure 7C:
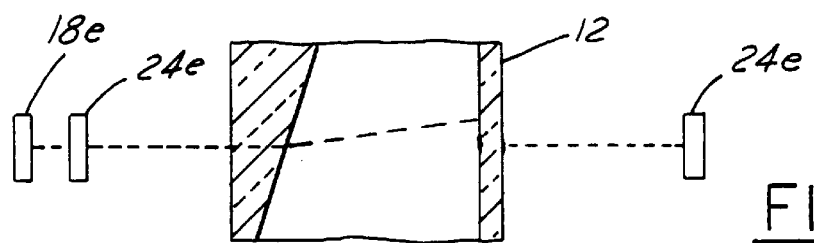

FIGS. 7A, 7B and 7C illustrate this principle. A sensor 24e (4.8 to 5 microns) is disposed on each side of container 12, and a sensor 18e (0.4 to 1.1 microns) is positioned on the left side only. If the signals received from the sensors 24e are different, they are averaged. The signal from sensor 18e and the average signal from sensors 24e are used to determine average double wall thickness. The sidewall glass cools proportionally to wall thickness. Therefore, the average double wall thickness can be converted to thickness at the left and right walls using the signals from sensors 24e at the left and right walls. Once a single point is calculated, the relationship that the glass cools proportional to thickness can be used to determine the thickness of glass for all other points on the container using the signals from sensors 24e (proportional to temperature only). The single point calibration must be at a point where sensor 18e is known to look through the left side of the container to the right side at the same point where the right sensor 24e is looking. FIGS. 7A and 7B illustrate correct calibration points, while 7C is incorrect. FIGS. 7A and 7B can be distinguished from FIG. 7C by using sensors 24e and finding a point where the change in signal vertically and horizontally indicates that the thickness on the left side is not changing.

Figure 3:
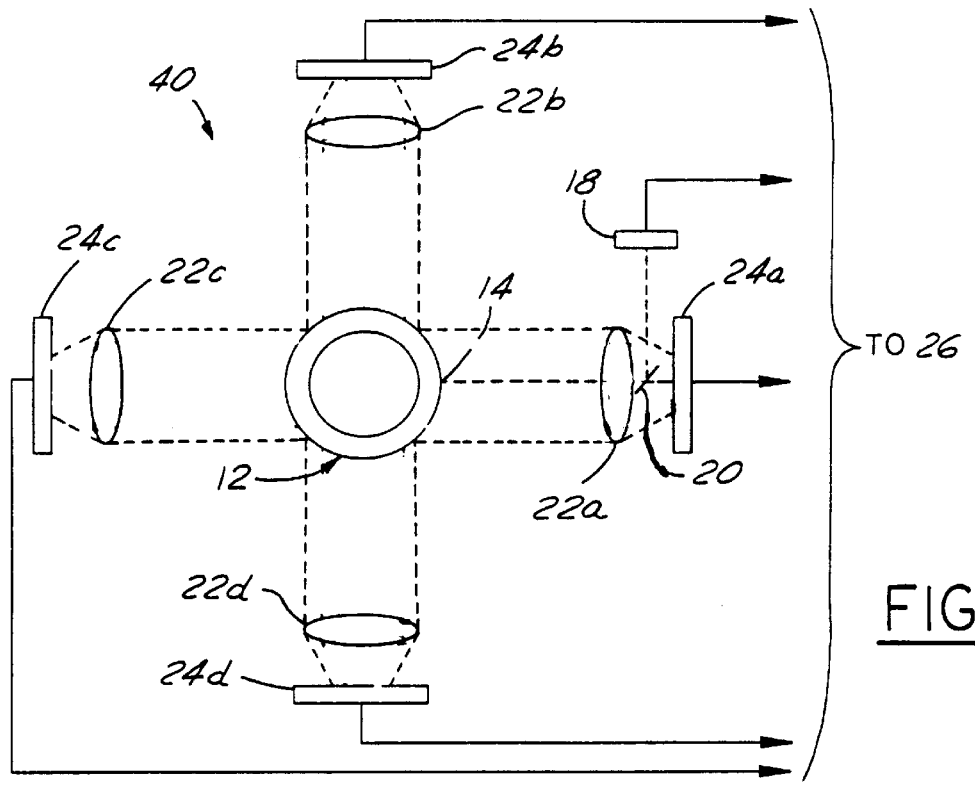
FIG. 3 is a schematic diagram of an embodiment of the invention for measuring wall thickness around the entire exterior surface of a hollow glass container.

FIG. 3 illustrates a third embodiment 40 in accordance with the present invention for measuring wall thickness entirely around the exterior surface of container 12. Four area array sensors 24a, 24b, 24c and 24d are disposed in a rectangular array at 9 increments around the exterior circumference of container 12. Each area array sensor 24a, 24b, 24c, 24d has an associated lens 22a, 22b, 22c, 22d for focusing onto the array energy emitted from one circumferential quadrant of container 12, so that arrays 24a, 24b, 24c, 24d collectively view the entire circumference of the container. Each area array sensor 24a, 24b, 24c, 24d comprises a multiplicity of individual CCD sensing elements disposed in an N×M rectangular area array, such that each of the sensing elements in each array receives energy radiated from a corresponding point or small area on the container exterior surface. Beamsplitter 20 is disposed so as to extract a portion of the energy radiated from one specific point 14 on the container exterior surface, and to direct such energy onto sensor 18. The various elements of area arrays 24a, 24b, 24c, 24d are responsive to energy at a wavelength at which the energy varies solely as a function of exterior surface temperature and independent of wall thickness—e.g., at the preferred wavelength of 5 microns—while sensor 18 is responsive to energy at a wavelength such that the intensity varies as a function of both temperature at the various surfaces of container 12 and wall thickness between the surfaces—e.g., in the preferred range of 0.4 to 1.1 microns The output of sensor 18, and the output of the specific sensor element in array 24a that receives energy from container exterior surface point 14, are employed by information processor 26 to obtain an absolute measurement of wall thickness at point 14, and thus to develop a relationship between wall thickness and exterior surface temperature. This temperature/thickness relationship at container point 14 may then be employed in combination with the container exterior surface temperatures developed at all other points around the container circumference by the various other elements on sensor arrays 24a, 24b, 24c, 24d to determine container wall thickness at each of the other points viewed by the sensor arrays.

Figure 4:
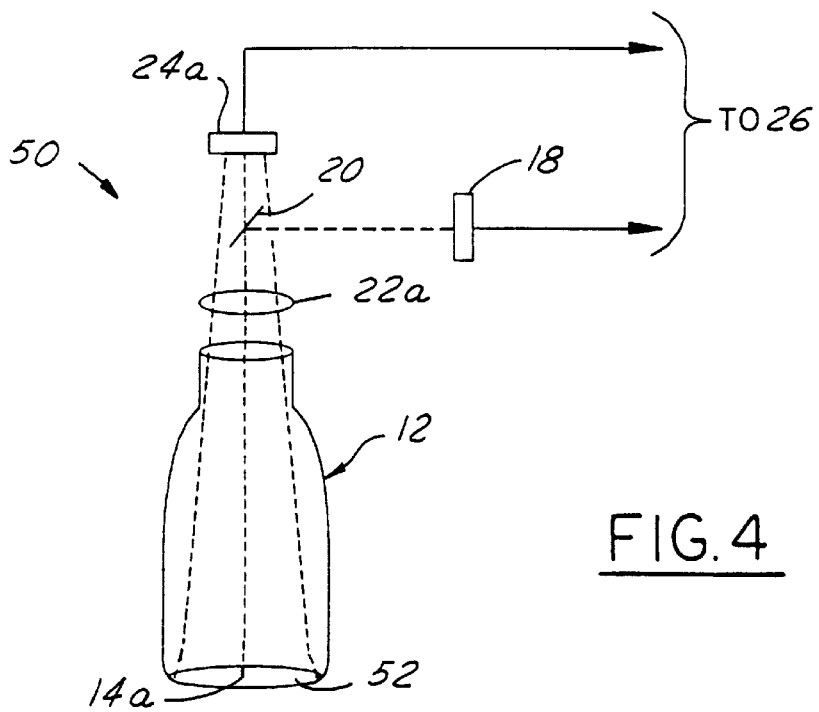
FIG. 4 is a schematic diagram of an apparatus for measuring wall thickness of a container bottom in accordance with the present invention.

FIG. 4 illustrates another modified embodiment 50 of the present invention for measuring thickness of the bottom 52 of container 12. Measurement of container bottom thickness can be obtained more reliably than sidewall thickness because only a single wall thickness is involved. Area array sensor 24a cooperates with lens 22a for viewing the entire area of container bottom 52. Beamsplitter 20 directs onto sensor 18 only energy emitted from a small area or point 14a on the container bottom. Thus, the output of sensor 18 varies as a function of both surface temperature and wall thickness between the interior and exterior surfaces at point 14a, while each element of area array sensor 24 receives energy at an intensity that varies as a function of temperature at each corresponding point or small area on the interior surface of bottom 52 and independent of bottom thickness. The output of sensor 18, and the output of the element in sensor array 24a that views point 14a on container bottom 52, are employed to determine absolute wall thickness at point 14a, and thus to develop a relationship between wall thickness and surface temperature. This relationship is employed by information processor 26 (FIG. 1) in combination with the output of the other elements on array sensor 24a for determining wall thickness at other points around the container bottom.

Figure 5:
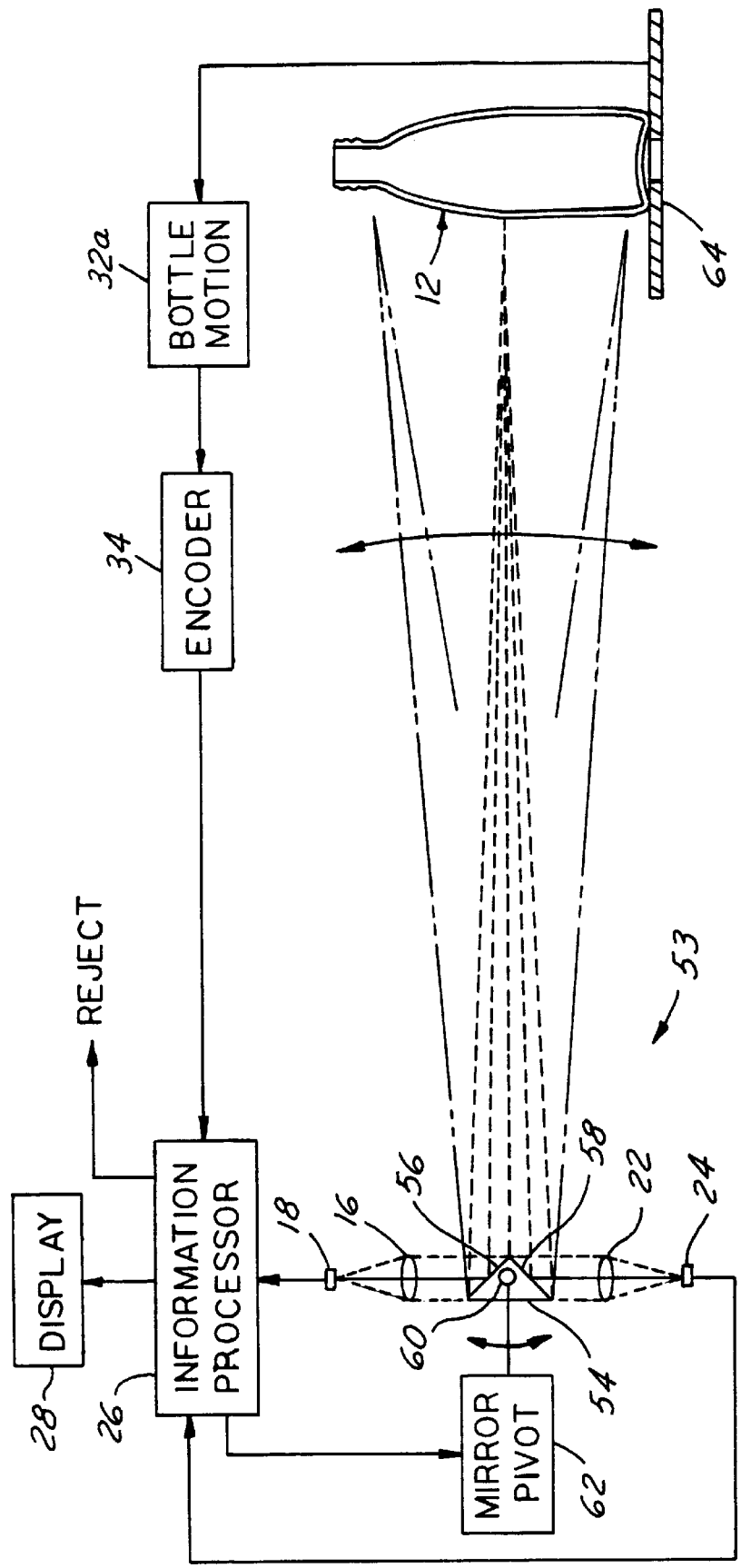
FIG. 5 is a schematic diagram of an apparatus for measuring wall thickness of a container sidewall in accordance with a further embodiment of the invention.

FIG. 5 illustrates a system 53 in accordance with another modified embodiment of the invention. In system 53, a prism 54 having reflective surfaces 56, 58 is positioned so that the fields of view of detectors 18, 24 through lenses 16, 22 are coincident at the adjacent surface of container 12. Mirrored prism 54 is mounted on a pivot 60 that is coupled to a motor or other suitable actuator 62 for rotating mirrored prism 56 under control of information processor 26. As mirrored prism 56 is rotated about pivot 60, the mirrored prism functions simultaneously to scan both detectors over the surface of container 12 while maintaining coincident fields of view. Container 12 is carried by a linear conveyor 64, such as is conventionally employed for conveying the containers while hot from the forming process from the container molding machine to the annealing lehr. Linear motion of conveyor 64 is sensed at 32a, encoded at 34 and fed to information processor 26. Thus, information processor 26 may control operation of mirrored prism motor 62 and scan the outputs of detectors 18, 24 at increments of container motion along conveyor 64 effectively to scan the entire opposing surface area of the container as it moves. An identical system 53 may be provided on the opposite side of conveyor 64 for scanning the surface area of the container. In this way, the entire surface area of the container is scanned as it passes from the molding machine to the annealing lehr, and information processor 26 may compile and display a complete two-dimensional map of container thickness versus position both axially and circumferentially of the container. More than two systems 53 may be employed, such as four systems as in FIG. 3.

Figure 6:
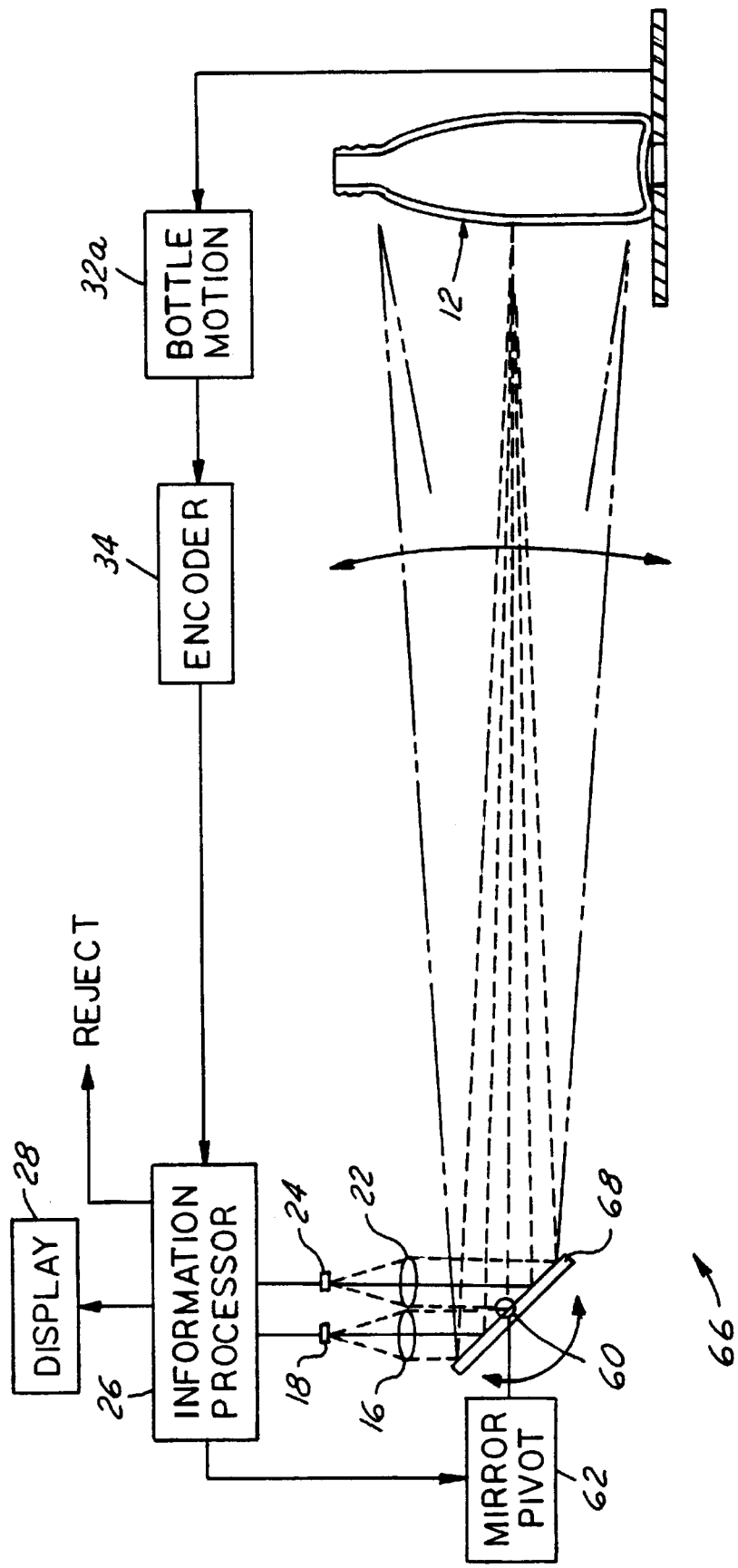
FIG. 6 is a schematic diagram similar to that of FIG. 5 but illustrating yet another embodiment of the invention.

FIG. 6 illustrates an embodiment 66 that is similar to that of FIG. 5, except that mirrored prism 54 in FIG. 5 is replaced by a flat reflector or mirror 68 mounted on pivot 60 controlled by motor 62. Once again, mirror 68, which may be flat, concave or of other suitable geometry, functions to reflect the fields of view of detectors 18, 24 onto the adjacent surface of container 12 in such a way that the fields of view coincide at the container surface. Mirror 68 is pivoted under control of information processor 26 to obtain thickness data in accordance with the present invention, as previously described.

If the glass is very opaque, then the signal in the 0.4 to 1.1 micron range cannot be used to calibrate the 4.8 to 5 micron signal. However, the signal proportional to surface temperature (4.8 to 5.0 microns) can be calibrated using a different technique. The total amount of glass in a container is nearly constant, while distribution may vary. Therefore, the average wall thickness for the whole container should be constant and known. This could be used to calibrate the average signal for sensor 24 (4.8 to 5.0 microns). This known average thickness makes the single point calibration from sensor 18 (0.4 to 1.1 microns) unnecessary. Preferably, a map of surface temperature versus position is obtained for the entire container, and this map is then employed in conjunction with known average wall thickness to determine actual wall thickness around the container.

What is claimed is:

1. A method of measuring wall thickness of molded hollow glass articles having interior and exterior wall surfaces while the articles are hot from the molding process, said method comprising the steps of:

(a) measuring a first intensity of radiation emitted by the article at a first wavelength at which the article wall is substantially transparent such that said first intensity varies as a function of both temperature at the article surfaces and wall thickness between such surfaces, (b) measuring a second intensity of radiation emitted by the article at a second wavelength at which the article wall is substantially opaque such that said second intensity varies as a function of temperature at the article surface and independent of wall thickness between the surfaces, and (c) determining wall thickness between the article surfaces as a combined function of said first intensity measured in said step (a) and said second intensity measured in said step (b).

2. The method set forth in claim 1 comprising the additional steps of:

(d) developing from said first and second intensities measured in said steps (a) and (b) a relationship between wall thickness and surface temperature at one point on the article, (e) measuring intensity of radiation emitted from at least one other point on the article at said second wavelength, and (f) determining wall thickness at said at least one other point on the article as a combined function of said intensity measured in said step (e) and said relationship developed in said step (d).

3. The method set forth in claim 1 wherein said first wavelength is in the range of 0.4 to 1.1 microns.

4. The method set forth in claim 3 wherein said second wavelength is in the range of 4.8 to 5 microns.

5. The method set forth in claim 4 wherein said second wavelength is substantially 5 microns.

6. The method set forth in claim 1 wherein said steps (a) and (b) are carried out by:

(d) providing first and second detection means for responding to radiation at said first and second wavelengths respectively, (e) positioning reflective means between said detection means and the article such that said detection means have fields of view that coincide at the article, and (f) moving said reflective means such that said coincident fields of view sweep the article.

7. The method set forth in claim 6 comprising the additional step of (g) scanning said first and second detection means at increments of motion at said reflective means.

8. The method set forth in claim 7 comprising the additional step of: (h) performing said steps (f) and (g) at increments of article motion with respect to said reflective means.

9. A method of measuring thickness between surfaces of a hot-formed glass article that emits radiation, comprising the steps of:

(a) measuring a first intensity of such radiation at a first wavelength at which the radiation is emitted from both surfaces of the article, (b) measuring a second intensity of such radiation at a second wavelength at which the radiation is emitted substantially entirely from only one surface of the article, and (c) determining thickness of the article between the surfaces as a combined function of said first and second intensities measures in said steps (a) and (b).

10. The method set forth in claim 9 wherein said steps (a) and (b) are carried out by:

(d) providing first and second detection means for responding to radiation at said first and second wavelengths respectively, (e) positioning reflective means between said detection means and the article such that said detection means have fields of view that coincide at the article, and (f) moving said reflective means such that said coincident fields of view sweep the article.

11. The method set forth in claim 10 comprising the additional step of (g) scanning said first and second detection means at increments of motion at said reflective means.

12. The method set forth in claim 11 comprising the additional step of: (h) performing said steps (f) and (g) at increments of article motion with respect to said reflective means.

13. Apparatus for measuring wall thickness of molded hollow glass articles having interior and exterior wall surfaces while the articles are hot from the molding process, comprising:

means for disposition exterior to the article to measure a first intensity of radiation emitted by the article at a first wavelength at which intensity varies as a function of both temperature at said surfaces and wall thickness between said surfaces, means for disposition exterior to the article to measure a second intensity of radiation emitted by the article at a second wavelength at which intensity varies as a function of temperature at said surface and independent of wall thickness between said surfaces, and means for determining wall thickness between said surfaces as a combined function of said first and said second intensities.

14. The apparatus set forth in claim 13 further comprising:

means for developing from said first and second intensities a relationship between wall thickness and surface temperature of the article, means for measuring intensities of radiation emitted from other points on the surface of the article at said second wavelength, and means for determining wall thickness at said other points on the article as a combined function of said intensifies emitted at such other points and said relationship between wall thickness and surface temperature.

15. The apparatus set forth in claim 14 wherein both said means for measuring intensities at said second wavelength comprise an area array sensor having a multiplicity of sensing elements and means for focusing on said elements infrared energy emitted from different points on the article surface.

16. The apparatus set forth in claim 15 comprising a plurality of said area array sensors disposed so as to view different surface areas of the article simultaneously.

17. The apparatus as set forth in claim 13 wherein said first wavelength is in the range of 0.4 to 1.1 microns.

18. The apparatus as set forth in claim 17 wherein said second wavelength is in the range of 4.8 to 5 microns.

19. The apparatus as set forth in claim 18 wherein said second wavelength is substantially 5 microns.

20. The apparatus set forth in claim 13 further comprising means positioned between the article and said means to measure said first and second intensities such that said means to measure said first and second intensities have fields of view that coincide at the article, and means for moving said positioned means such that said coincident fields of view sweep the article.

21. The apparatus set forth in claim 20 further comprising means for scanning data indicative of intensities of energy at such wavelengths at said means to measure said intensities.

22. The apparatus set forth in claim 21 further comprising means for controlling said moving means and said scanning means to sweep the article and scan said data at increments of motion of the article.

23. A method of measuring wall thickness of molded hollow glass articles having a predetermined average wall thickness, and while the articles are hot from the molding process, comprising the steps of:
   (a) measuring intensity of radiation emitted by the article indicative of surface temperature,
   (b) determining wall thickness of the article as a combined function of intensity measured in said step (a) and said predetermined average wall thickness.

24. The method of claim 23 wherein said step (a) comprises developing a map of surface temperature versus position around the article, and wherein said step (b) comprises the step of determining wall thickness as a combined function of said map and said average wall thickness.

* * * * *